(12) United States Patent
Bihel et al.

(10) Patent No.: US 11,518,503 B2
(45) Date of Patent: Dec. 6, 2022

(54) HYDROELASTIC DAMPER, AND AN AIRCRAFT

(71) Applicant: AIRBUS HELICOPTERS, Marignane (FR)

(72) Inventors: Jean-Romain Bihel, Le Rove (FR); Damien Sequera, Dos Hermanas (ES); Jean-Pierre Jalaguier, Vitrolles (FR)

(73) Assignee: AIRBUS HELICOPTERS, Marignane (FR)

( * ) Notice: Subject to any disclaimer, the term of this patent is extended or adjusted under 35 U.S.C. 154(b) by 292 days.

(21) Appl. No.: 16/425,178

(22) Filed: May 29, 2019

(65) Prior Publication Data

US 2019/0367163 A1 Dec. 5, 2019

(30) Foreign Application Priority Data

May 31, 2018 (FR) ...................................... 1800539

(51) Int. Cl.
*B64C 27/00* (2006.01)
*B64C 27/06* (2006.01)
(Continued)

(52) U.S. Cl.
CPC ............ *B64C 27/001* (2013.01); *B64C 27/06* (2013.01); *F16F 13/002* (2013.01); *F16F 15/023* (2013.01); *B64C 2027/003* (2013.01)

(58) Field of Classification Search
CPC . B64C 27/001; B64C 2027/003; B64C 27/54; B64C 27/57; B64C 27/02;
(Continued)

(56) References Cited

U.S. PATENT DOCUMENTS 3,091,449 A * 5/1963 Boutefoy .................. F16F 9/46
267/67
4,915,585 A * 4/1990 Guimbal ................. B64C 27/51
416/107
(Continued)

FOREIGN PATENT DOCUMENTS

CN 102501970 A 6/2012
EP 0759128 B1 3/1996
(Continued)

OTHER PUBLICATIONS

French Search Report for French Application No. FR 1800539, Completed by the French Patent Office, dated Mar. 5, 2019, 6 pages.

*Primary Examiner* — Philip J Bonzell
*Assistant Examiner* — Ashesh Dangol
(74) *Attorney, Agent, or Firm* — Brooks Kushman P.C.

(57) ABSTRACT

A hydroelastic damper comprising at least a first resilient assembly that is provided with a first inner strength member engaged at least in part in a first outer strength member, a first resilient member providing resilient return for the first outer strength member and the first inner strength member towards a rest position (POSREP). The hydroelastic damper comprises at least one hydraulic assembly provided with a first hydraulic chamber and a second hydraulic chamber in communication with each other via a connection provided in a first wall of the hydraulic assembly. A first floating piston is movable at least in translation along the longitudinal axis relative to the first inner strength member and to the first outer strength member, the first hydraulic chamber being defined at least by the first floating piston and the first wall in order to protect the first resilient member.

20 Claims, 4 Drawing Sheets

(51) Int. Cl.
*F16F 13/00* (2006.01)
*F16F 15/023* (2006.01)

(58) Field of Classification Search
CPC ........ F16F 13/002; F16F 15/023; F16F 9/325;
F16F 9/092; F16F 9/34
See application file for complete search history.

(56) References Cited

U.S. PATENT DOCUMENTS

| | | | |
|---|---|---|---|
| 10,632,805 B1* | 4/2020 | Rositch | B60G 3/01 |
| 2013/0164131 A1 | 6/2013 | Russell | |
| 2017/0043868 A1* | 2/2017 | Sequera | B64C 27/64 |

FOREIGN PATENT DOCUMENTS

| | | |
|---|---|---|
| EP | 1000274 B1 | 7/2000 |
| EP | 2015988 B1 | 2/2012 |
| EP | 2678222 B1 | 11/2016 |
| EP | 3130537 A1 | 2/2017 |
| FR | 2736890 A1 | 1/1997 |
| FR | 2950027 A1 | 3/2011 |
| WO | 2008060681 A2 | 5/2008 |
| WO | 2008060681 A3 | 5/2008 |
| WO | 2012148389 A1 | 11/2012 |
| WO | 2013152300 A2 | 10/2013 |

\* cited by examiner

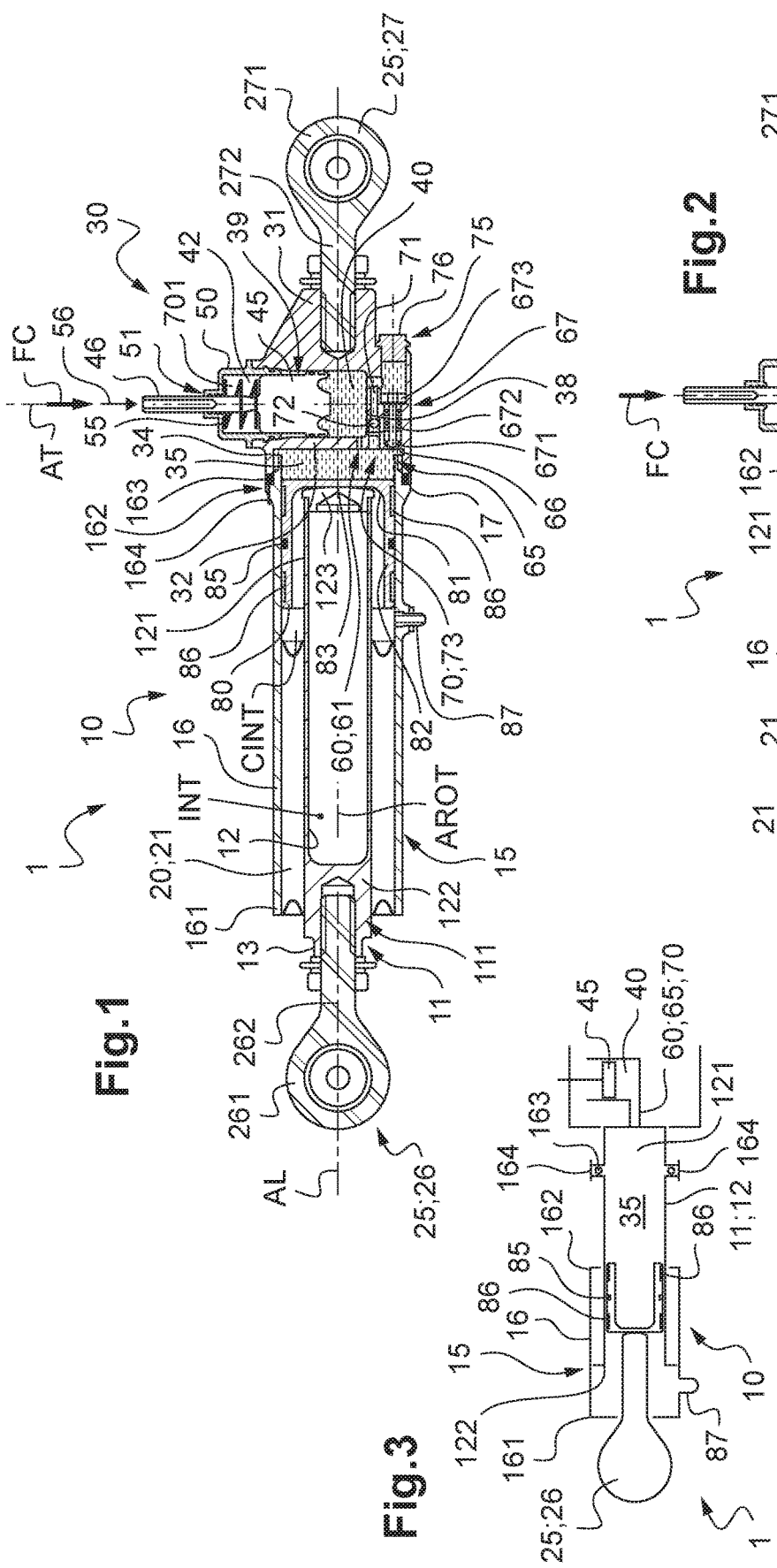

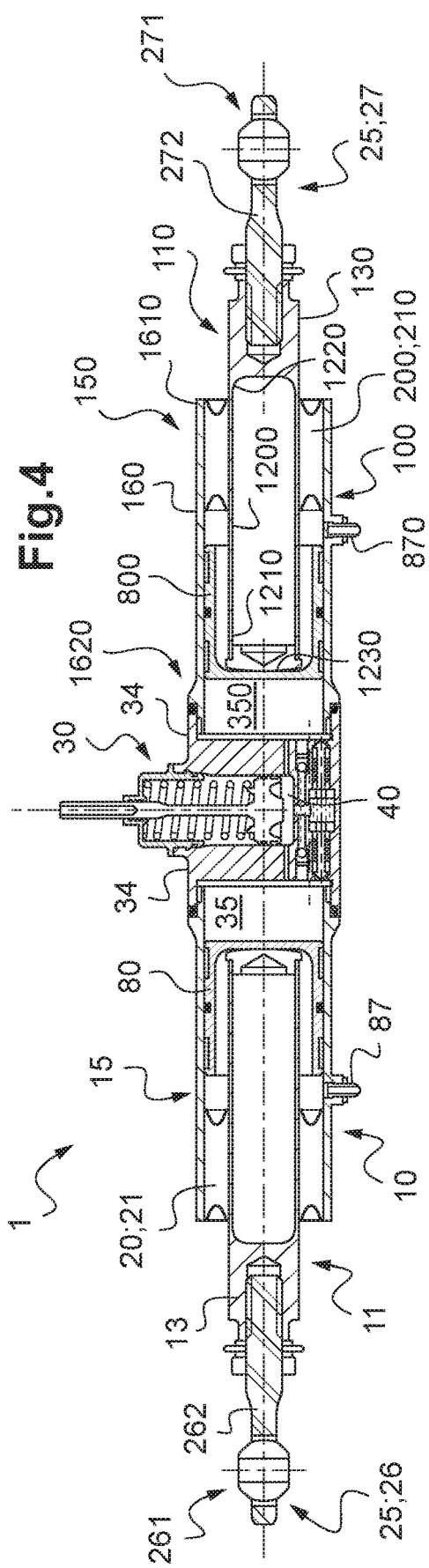
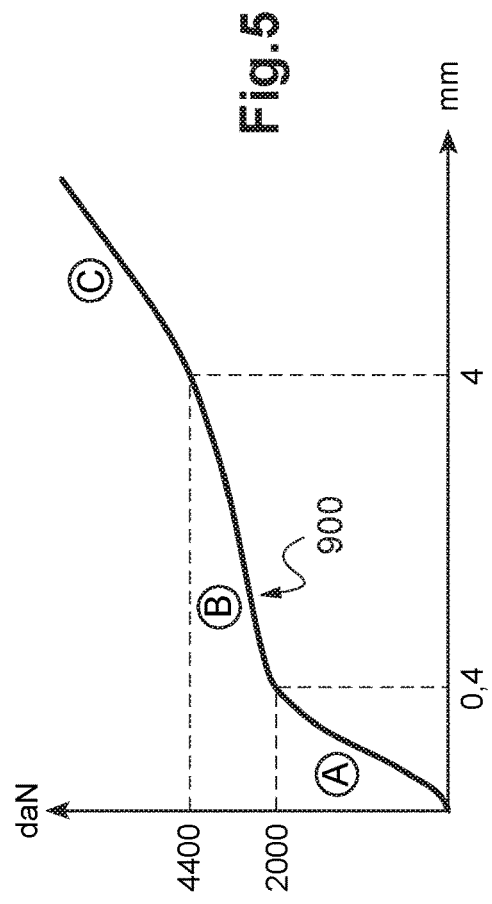

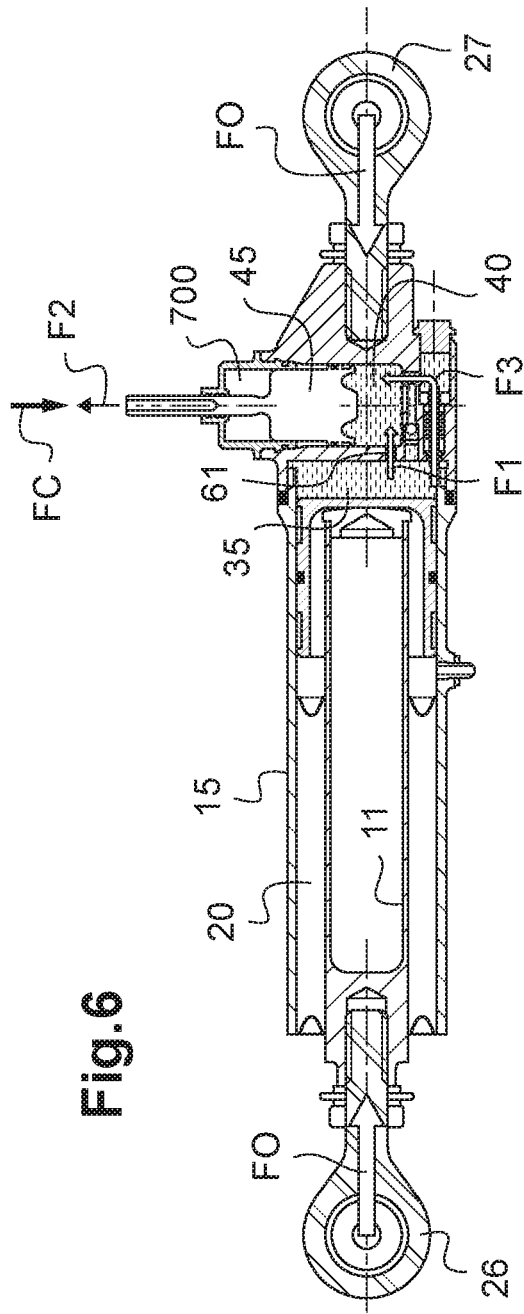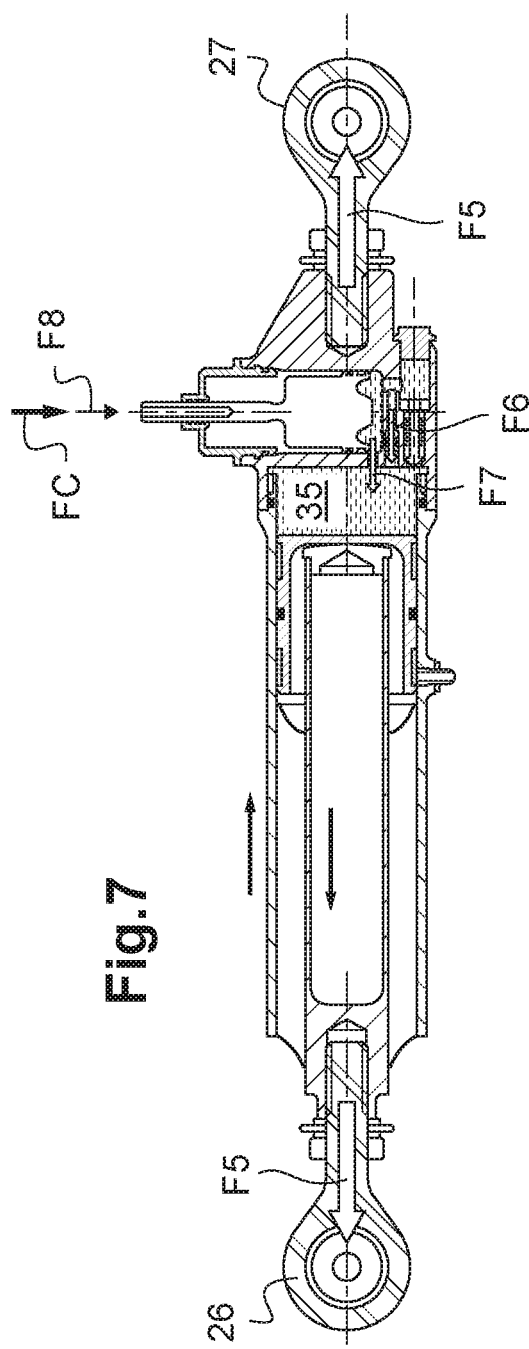

HYDROELASTIC DAMPER, AND AN AIRCRAFT

CROSS-REFERENCE TO RELATED APPLICATIONS

This application claims priority to French patent application No. FR 1800539 filed on May 31, 2018, the disclosure of which is incorporated in its entirety by reference herein.

BACKGROUND OF THE INVENTION

(1) Field of the Invention

The present invention provides a hydroelastic damper, and also an aircraft including at least one hydroelastic damper of this type.

The invention relates to the general technical field of damping movements of a mechanical system, and more particularly of pieces of equipment including damper systems as used in aviation.

The invention is particularly applicable for lead-lag dampers used on a rotor for providing lift to a rotorcraft, and in particular to a helicopter. The invention thus lies in the narrow technical field, of lead-lag dampers.

(2) Description of Related Art

On a helicopter rotor, a damper device may connect each blade or blade fastener means to the hub of the rotor, or it may connect together two mutually adjacent blades or blade fastener means. Such a damper device is referred to as a "lead-lag damper" or sometimes as a "frequency adapter with incorporating damping".

A known damper device may present resilient return members having an elastomer material.

Document FR 2 950 027 discloses a device having a plurality of elastomer blocks.

Document CN 102 501 970 also describes a system having a plurality of elastomer blocks.

Another type of damper device, referred to as a "mixed" damper device can be used. A mixed damper device is in the form of a hydroelastic damper that is provided with an elastic member and a hydraulic system connected in parallel.

Depending on the embodiment, the hydraulic fluid may be in contact with an elastomer material of the resilient member. Under such circumstances, the hydraulic fluid tends to degrade the elastomer.

Document FR 2 736 890 describes a damper device of that type.

Document EP 1 000 274 describes a hydroelastic damper.

Document US 2013/0164131 also describes a hydroelastic damper. A first ring having an elastomer material extends radially between an intermediate strength member and a central strength member, and a second ring having an elastomer material extends radially between an intermediate strength member and an outer strength member.

Document EP 2 678 222 describes a hydroelastic damper having a first connection member secured to a hydraulic system. A second connection member is secured to a strength member, a resilient member being interposed between the strength member and the hydraulic system. The connection member and the hydraulic system operate in series as a result of the first connection member moving relative to the second connection member, i.e. one after the other.

Documents WO 2012/148389, WO 2013/152300, SP 3 130 537, and EP 2 015 988 are also known.

BRIEF SUMMARY OF THE INVENTION

An object of the present invention is thus to propose a hydroelastic damper having a resilient member and a novel hydraulic system for optimizing its lifetime.

According to the invention, a hydroelastic damper comprises at least one resilient assembly, said at least one resilient assembly including a first resilient assembly, said first resilient assembly comprising a first inner strength member that is engaged at least in part in a first outer strength member, the first inner strength member and the first outer strength member being movable relative to each other at least in translation along a longitudinal axis. The first resilient assembly comprises a first resilient member secured to the first outer strength member and to the first inner strength member so as to provide resilient return of the first outer strength member and of the first inner strength member towards a rest position. The hydroelastic damper comprises at least one hydraulic assembly provided with a first hydraulic chamber and a second hydraulic chamber in communication with each other via at least one connection provided in a first wall of the hydraulic assembly, a fluid being arranged at least in said first hydraulic chamber and in said second hydraulic chamber.

The hydroelastic damper includes a first floating piston that is movable at least in translation along the longitudinal axis relative to the first inner strength member and to the first outer strength member, said first hydraulic chamber having a volume that is variable and that is defined at least by said first floating piston and said first wall, said first floating piston hydraulically isolating said first resilient member from the fluid. Although the first piston is mounted to float relative to the first inner strength member and to the first outer strength member, the first piston can move together with one of those strength members, at least in certain configurations.

The term "a first inner strength member that is engaged at least in part in a first outer strength member" means that the inner strength member extends at least into a space defined by the outer strength member. For example, the inner strength member and the outer strength member may be coaxial.

The hydroelastic damper thus has a first piston floatingly mounted in the first resilient assembly, i.e. a first piston that is movable relative to the members of the first resilient assembly. The first floating piston is arranged between the first resilient member and the hydraulic fluid, and in particular between the first resilient member and the first hydraulic chamber. This first floating piston thus provides a barrier preventing hydraulic fluid from coming into contact with the first resilient member. This first resilient member may then be made of a material from the elastomer group and may have a lifetime that is optimized.

Specifically, contact between oil and an elastomer is, for example, likely to be harmful for the elastomer, depending on the pressure of the oil, on the temperature of the oil, and indeed on the chemical composition of the oil. The first floating piston can then serve to protect the first resilient member by isolating the first resilient member from the hydraulic fluid.

Installing a floating piston for the purpose of optimizing a lifetime is not obvious insofar as such a movable piston is itself the subject of fatigue wear. Nevertheless, since the first piston is floatingly mounted, the first piston is subjected to little radial force. The radial forces to which it is subjected are due solely to the centrifugal force exerted on the first floating piston. The lifetime of the floating piston and of the associated members, and of a gasket, if any, is thus optimized. In order to maximize this lifetime, the floating piston may be made of a lightweight material in order to minimize the radial forces to which it is subjected and which are exerted on a dynamic gasket, for example. By way of example, such a lightweight material may comprise an aluminum alloy, a material from the plastics group.

Furthermore, the first floating piston may tend to avoid a phenomenon of cavitation in the first hydraulic chamber as a result of the damper being extended quickly. Specifically, the floating mount of the first floating piston tends to avoid the presence of a vacuum in the first hydraulic chamber.

The hydroelastic damper may also include one or more of the following characteristics.

In an aspect, the first floating piston may slide along the first outer strength member or the first inner strength member, a first gasket being arranged between said first floating piston and said first outer strength member or first inner strength member along which the first floating piston slides.

One or more first gaskets may be provided. Such a first gasket is a dynamic gasket and tends to avoid fluid passing to the first resilient assembly.

The first gasket may be arranged in a groove in the first floating piston, or in the first outer strength member, or in the first inner strength member, and it may project out from that groove.

In an aspect, the first floating piston may slide along the first outer strength member or the first inner strength member, with at least two first guide rings being arranged each between the first floating piston and the first outer strength member or the first inner strength member along which the first floating piston slides.

Each guide ring may extend in a groove in the first floating piston, or in the first outer strength member, or in the first inner strength member, and it may project out from that groove.

The floating mount of the first floating piston serves to minimize the radial forces to which the first floating piston is subjected and to which the first gasket and/or the first guide rings are subjected. Under such circumstances, the lifetime of the first gasket and/or of the first guide rings is optimised.

In an aspect, the first floating piston is not fastened to the first resilient assembly and is not fastened to the hydraulic assembly.

The first floating piston may slide in the first outer strength member or in the first inner strength member. For example, the first floating piston is movable in translation along the longitudinal axis relative to the first inner strength member and to the first outer strength member, and can be movable in rotation about the longitudinal axis.

In an aspect, the first hydraulic chamber may be defined in part by the first outer strength member or the first inner strength member. The first hydraulic chamber may be defined in part by the strength member along which the first floating piston slides.

In an aspect, the first wall may be constrained to move in translation along the longitudinal axis with the first outer strength member or the first inner strength member. The first wall may be constrained to move in translation along the longitudinal axis of the strength member along which the first floating piston slides.

The hydroelastic damper may be of modular design. The first resilient assembly and the hydraulic assembly can then be dismantled in non-destructive manner, the first hydraulic chamber being arranged between them. This modular design can enable maintenance costs and/or the cost of spare parts to be optimized.

In an aspect, the first inner strength member or the first outer strength member may exert only point thrust on a first point of the first floating piston when the first floating piston is in contact with the first inner strength member or first outer strength member.

For example, when the first floating piston slides along a strength member, it is the other strength member that can exert said point thrust.

For example, when the hydroelastic damper is compressed, the first inner strength member pushes the first floating piston by point thrust so as to move the hydraulic fluid from the first hydraulic chamber towards the second hydraulic chamber. Such point thrust seeks to avoid introducing radial forces into the first floating piston, or into the first gasket or the first guide rings, if any.

Optionally, the first point of the first floating piston is situated on an axis of symmetry and of revolution of said first floating piston.

In an aspect, the hydraulic assembly may comprise a casing that includes said first wall, said second hydraulic chamber being defined by said casing and by an expansion piston that is movable in translation relative to the casing.

On a rotor, the expansion piston may be positioned so as to move substantially along the direction of the centrifugal force exerted on the expansion piston so as to minimize the radial forces to which the expansion piston is subjected.

In a first embodiment, said damper assembly is secured to a ball-joint connection head in alignment with a ball-joint connection head of said first resilient assembly.

In this embodiment, the hydroelastic damper comprises only the first resilient assembly and the hydraulic assembly.

In a second embodiment, the hydroelastic damper comprises two resilient assemblies of the above-described type together with one hydraulic assembly.

Under such circumstances, said at least one resilient assembly comprises a second resilient assembly, said second resilient assembly comprising a second inner strength member and a second outer strength member that are movable relative to each other at least in translation along the longitudinal axis, said second resilient assembly comprising a second resilient member secured to the second outer strength member and to the second inner strength member so as to provide resilient return for the second outer strength member and the second inner strength member towards an initial position, said hydroelastic damper comprising a third hydraulic chamber, which is optionally in fluid flow communication with the second hydraulic chamber via at least one channel provided in a second wall of the hydraulic assembly and/or in fluid flow communication with the first hydraulic chamber, said hydroelastic damper including a second floating piston that is movable at least in translation along the longitudinal axis relative to the second inner strength member and to the second outer strength member, said third hydraulic chamber having a volume that is variable and that is defined at least by said second floating piston and by said second wall, said second floating piston hydraulically isolating said second resilient member from the fluid.

Optionally, the second floating piston may slide along the second outer strength member or the second inner strength member, with a gasket being arranged between said second floating piston and said second outer strength member or the second inner strength member along which the second floating piston slides.

Optionally, the second floating piston may slide along the second outer strength member or the second inner strength member, at least two guide rings may be arranged each between the second floating piston and the second outer strength member or the second inner strength member along which the second floating piston slides.

Optionally, the second floating piston is not fastened to the second resilient assembly and is not fastened to the hydraulic assembly.

Optionally, the third hydraulic chamber is defined in part by the second outer strength member or the second inner strength member.

Optionally, the second wall is constrained to move in translation with the second outer strength member or with the second inner strength member.

Optionally, the first and second resilient assemblies are positioned on either side of the second hydraulic chamber, two ball-joint connection heads belonging respectively to the first and second resilient assemblies being in alignment.

Optionally, the second inner strength member or the second outer strength member exerts point thrust only on a second point of the second floating piston when the second floating piston is in contact with the second inner strength member or the second outer strength member.

Optionally, the second point of the second floating piston is situated on an axis of symmetry and of revolution of said second floating piston.

Furthermore, an aircraft may be provided with a rotor contributing at least to providing the aircraft with lift, said rotor comprising a hub carrying a plurality of lift assemblies and at least one hydroelastic damper of the invention.

In particular, the rotor may include inter-blade hydroelastic dampers.

Under such circumstances, each lift assembly is arranged circumferentially between two other lift assemblies and it is connected to those two other lift assemblies by two respective hydroelastic dampers. Each hydroelastic damper is then hinged to one blade and to an adjacent blade.

BRIEF DESCRIPTION OF THE DRAWINGS

The Invention and its advantages appear in greater detail from the context of the following description of examples given by way of illustration and with reference to the accompanying figures, in which:

FIGS. 1 to 3 are diagrams showing a hydroelastic damper having a resilient assembly;

FIG. 4 is a diagram showing a hydroelastic damper having two resilient assemblies;

FIG. 5 is a diagram showing a "triple slope" relationship as applied by the hydroelastic damper of FIGS. 1 to 4;

FIGS. 6 and 7 are diagrams explaining the operation of a hydroelastic damper of the invention;

DETAILED DESCRIPTION OF THE INVENTION

Figure 8:
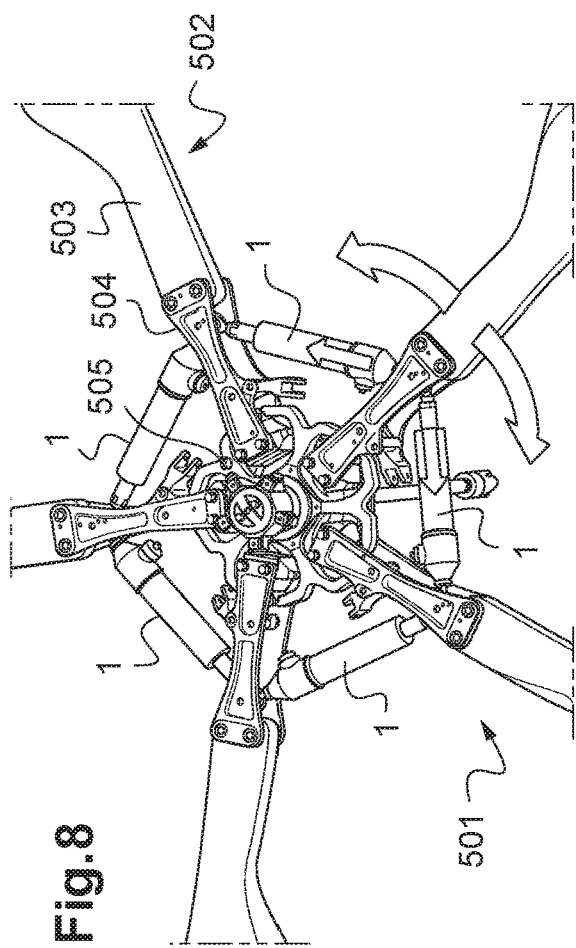
FIG. 8 is a diagram showing a rotor having hydroelastic dampers of the invention.

FIG. 1 shows an embodiment of a hydroelastic damper 1 of the invention.

Independently of the embodiment, the hydroelastic damper 1 includes at least one resilient assembly. Each resilient assembly comprises an inner strength member, an outer strength member, a resilient return member secured to the inner strength member and to the outer strength member, or at least constrained to move in translation therewith, and possibly also a connection head for fastening to another piece of equipment.

Under such circumstances, the hydroelastic damper 1 includes at least one resilient assembly referred to as the "first" resilient assembly 10.

The first resilient assembly 10 has a first inner strength member 11. This first inner strength member 11 may comprise a single piece or a plurality of pieces that are fastened to one another.

The first inner strength member 11 may comprise a first inner cylinder 12, which is hollow. By way of example, the first inner cylinder 12 may have a base that is circular or of some other shape, e.g. a polygonal shape. The first inner cylinder 12 may extend longitudinally along a longitudinal axis AL from an end referred to as its "first inner end" 121 to an end referred to as its "first outer end" 122. The longitudinal axis AL may be an axis of symmetry of the first inner cylinder 12. The compression and extension forces that are exerted on the hydroelastic damper may optionally be directed along this longitudinal axis AL.

The first resilient assembly 10 also comprises a first outer strength member 15. This first outer strength member 15 may comprise a single piece or a plurality of pieces that are fastened to one another.

The first outer strength member 15 surrounds the first inner strength member 11, at least in part, and by way of example it surrounds at least a portion of the inner cylinder 12.

Thus, the first outer strength member 15 may comprise a first outer cylinder 16, which is hollow. The first outer cylinder 16 may surround the inner cylinder 12 at least in part. The first outer cylinder 16 and the first inner cylinder 12 may be coaxial. By way of example, the first outer cylinder 16 may have a base that is circular, or it may have a base of some other shape. The first outer cylinder 16 may extend longitudinally along the longitudinal axis AL from an end portion, referred to as its "first outer end zone" 161, to an end portion referred to as its "first inner end zone" 162.

Furthermore, the first resilient assembly 10 comprises a first resilient member 20 connecting the first outer strength member 15 to the first inner strength member 11 and allowing the first outer strength member 15 at least one degree of freedom to move in translation along the longitudinal axis AL relative to the first inner strength member 11. The first resilient member 20 provides the first outer strength member 15 and the first inner strength member 11 with resilient return towards the rest position POSREP shown in FIG. 1.

The first resilient member 20 extends radially, i.e. perpendicularly to the longitudinal axis AL, between at least one face of the first inner cylinder 12 and a face of the first outer cylinder 16, which faces face each other.

The first resilient member 20 may include at least one first block 21 comprising a material of the elastomer group, and in particular an elastomer block that is secured to the first inner cylinder and to the first outer cylinder, or that is constrained to move in translation therewith. The resilient member may thus comprise one or more annular elastomer blocks 21, as shown in FIG. 2.

The first resilient member 20 may comprise resilient subassemblies of some other type, e.g. springs or the equivalent.

The term "first resilient member" thus designates a subassembly that connects the first inner strength member to the first outer strength member and that deforms elastically in the event of relative movement in translation between the first inner strength member 11 and the first outer strength member 15.

In the alternative shown in FIG. 1, the first inner strength member 11 may have a first fastener end 13 that extends the first inner cylinder 12 along the longitudinal axis AL, being adjacent to the first outer end 122. This first fastener end 13 closes the first inner cylinder at its first outer end 122, while, on the contrary, the first inner end 121 is open to the outside and possibly shut by a plug 123. The first fastener end 13 may be fastened to the first inner cylinder 12 by conventional screw, welding, riveting, . . . means, or the first fastener end 13 and the first inner cylinder 12 may represent two segments of a single unitary part.

Independently of this aspect, the first inner strength member 11 may define an internal space INT that is shut by the plug 123 in order to minimize its weight.

Furthermore, a connection head 25 referred to as the "first connection head" 26 may be secured to the first fastener end 13. This first connection head 26 is secured to the first inner strength member 11, or is at least constrained to move together therewith in translation along the longitudinal axis AL. This first connection head 26 may be integrated in the first inner strength member 11, or it may be fastened thereto by conventional means. For example, the first connection head 26 may have a ball-joint head 261 secured to a leg 262, the ball-joint head 261 being provided with a universal joint centered on the longitudinal axis AL, and/or the leg 262 possibly being screwed into the first fastener end 13.

In addition, the first outer end zone 161 may be open. In the example of FIG. 1, the first outer end zone 161 surrounds the first inner strength member, while the first inner end zone 162 projects longitudinally from the first inner end 121 of the first inner strength member 11.

In the alternative shown in FIG. 3, the first fastener end 13 is secured, not to the first inner strength member, but rather to the first outer strength member 15. The first outer strength member 15 then has the first fastener end 13 that extends the first outer cylinder 16 along the longitudinal axis AL, being adjacent to the first inner end zone 161.

Furthermore, the hydroelastic damper 1 includes a hydraulic assembly 30 in which a fluid 41 flows, optionally but not necessarily oil. The hydraulic assembly serves to provide damping in particular in the event of the hydroelastic damper 1 being compressed.

The hydraulic assembly 30 comprises a casing 31 fastened to each resilient assembly, e.g. by conventional means in reversible and non-destructive manner. The casing 31 may comprise a single piece or a plurality of pieces that are fastened to one another.

In the variant of FIG. 1, the casing 31 is thus fastened to the first inner end zone 162 of the first outer strength member 15, optionally by conventional means 164 and a static gasket 163. The casing 31 is thus constrained to move in translation along the longitudinal axis AL with the first outer strength member 15. In the variant of FIG. 3, the casing 31 is fastened to the first inner end of the first inner strength member 11, possibly by conventional means 164 and a static gasket 163. By way of example, these conventional reversible fastener means 164 may comprise screws.

In another aspect, and with reference to FIG. 1, the casing 31 may comprise one connection cylinder 34 per resilient assembly. The connection cylinder 34 may bear against a shoulder 17 of the outer cylinder of an outer strength member or of the inner cylinder of a inner strength member, depending on the variant. The static gasket 163 may be arranged between the connection cylinder 34 and the cylinder of the resilient assembly fastened to the connection cylinder.

In addition, the hydraulic assembly 30 includes one variable volume compression chamber per resilient assembly in communication via a wall of the hydraulic assembly with an expansion chamber that is arranged in the casing 31. Each compression chamber may be defined by the corresponding resilient assembly and the casing 31. Thus, the hydraulic assembly is provided with at least one compression chamber referred to as its "first" hydraulic chamber 35 that is defined by the first resilient assembly and the casing 31, and with an expansion chamber that is referred to as its "second" hydraulic chamber 40. The various chambers are filled with the fluid 41. The first hydraulic chamber 35 and the second hydraulic chamber 40 are in hydraulic communication via at least one connection provided in a first wall 32 of the casing 31.

By way of example, the second hydraulic chamber 40 is provided in a cavity 39 of the hydraulic assembly. In particular, the second hydraulic chamber 40 is defined in a transverse direction AT by an end wall 38 of the cavity 39 and by an expansion piston 45. The expansion piston 45 thus separates the second hydraulic chamber 40 from a return chamber 42 in the cavity 39. The expansion piston 45 is movable in translation in the cavity 39 along the transverse direction AT. The transverse direction AT may be orthogonal or substantially orthogonal to the longitudinal axis AL. The transverse direction AT may lie on the same axis as the centrifugal force FC as described below, or substantially on that axis. A dynamic gasket may be arranged between the expansion piston 45 and the casing 31.

Under such circumstances, the second hydraulic chamber 40 has a volume that varies as a function of the position of the expansion piston 45 in the cavity 39, with variation of this volume giving rise to movement of the expansion piston. A return spring 55 and/or compressed air 701 may be arranged in the return chamber 42 in order to exert a force on the expansion piston 45 to urge the expansion piston 45 towards the end wall 38 in a transverse direction 56 going from the expansion piston 45 towards the end wall 38. The term "return spring" 55 is used to designate either a spring as such, or more generally any resilient equipment.

A seat 50 may be fastened to the casing 31 in order to define the return chamber 42 axially. Where applicable, the return spring 55 may then bear against the seat 50 and against a face of the expansion piston 45, the return spring 55 extending in the return chamber 42. Optionally, at least one rod 46 is secured to move in translation with the piston 45. This rod 46 may be mounted to slide through a guide orifice 51 in the seat 50. The hydroelastic damper may also include a port for inspecting fluid level. The rod 46 may thus include at least one mark serving to identify its position relative to a reference position.

Optionally, the transverse direction AT may be configured to lie on the same axis as the centrifugal force FC that acts in operation on the expansion piston 45, or it may lie substantially on the axis of the centrifugal force FC, i.e. it may depart from the axis of the centrifugal force FC by an acute angle that is less than or equal to 15 degrees. Likewise, the transverse direction 56 may be configured to coincide with said centrifugal force FC, or it may lie substantially on the same axis as the centrifugal force FC, i.e. it may depart from the centrifugal force FC by an acute angle that is less than or equal to 15 degrees.

Furthermore, the hydraulic assembly 30, and in particular the damper 31, may include a filler opening 75 that is in fluid flow communication with the second hydraulic chamber 40 in order to fill the fluid 41 into the hydroelastic damper 1. This filler opening 75 is shut by a plug 76.

Furthermore, the casing 31 has at least one hydraulic connection passing therethrough for each resilient assembly, the connection leading to a compression chamber, and it may possibly have at least three or only three connections 60, 65, and 70 per resilient assembly.

Thus, at least one hydraulic connection, also referred to merely as a "connection", 60, 65, 70 passes through a first wall 32 of the casing 31 in order to put the first hydraulic chamber 35 into fluid flow communication with the second hydraulic chamber 40.

By way of example, the second hydraulic chamber 40 is hydraulically connected by at least three hydraulic connections 60, 65, 70 and possibly by only three hydraulic connections 60, 65, 70 to the first hydraulic chamber 35.

Each connection 60, 65, 70 comprises at least one pipe or the equivalent forming a passage in which the fluid flows.

Thus, a first connection 60 comprises only a duct 61 in which the fluid is throttled as it passes along that duct. The duct 61 may comprise one or more passages in fluid flow communication. The duct may present a section that is constant, or it may include a constriction presenting a section of area that is smaller than the areas of the other sections in the duct. The duct may lead into a space in fluid flow communication with the filler opening 75. The duct may open out directly into the second hydraulic chamber.

A second connection 65 comprises at least a first passage 66 and a pressure-relief valve 67. The pressure-relief valve 67 is configured to allow the fluid to flow in the second connection only from the first hydraulic chamber 35 to the second hydraulic chamber 40, and only when the pressure of the fluid in the first hydraulic chamber 35 exceeds a threshold.

By way of example, the pressure-relief valve may comprise a finger 671 secured to a spring 672, the spring 672 tending to urge the finger 671 against the first passage 66 in order to shut it. The spring 672 may also extend between the finger 671 and a nut 673 that is movable in translation and that has a central hole. This nut 673 can thus be screwed forwards or backwards in order to adjust the "pre-load" on the spring 672. For this purpose, the nut 673 may lie on the axis of the filler opening 75. Adjusting the "pre-load" of the spring 672 serves to adjust the pressure threshold in the compression chamber from which the finger 671 moves away from the first passage 66 so as to allow fluid to flow. A second nut may serve to adjust the opening stroke of the pressure-relief valve in order to adjust the curve followed by the beginning of the third slope, as described below. Other types of pressure-relief valve may be used.

A third connection 70 comprises at least one second passage 71 and a check valve 73. The check valve 73 is configured to allow the fluid to flow in the third connection only from the second hydraulic chamber 40 towards the first hydraulic chamber 35, and only when the pressure of the fluid in the first hydraulic chamber 35 is less than the pressure of the fluid in the second hydraulic chamber 40. By way of example, the check valve may comprise a movable ball 72 that is suitable for shutting or not shutting the second passage 71.

Independently of the nature of the connections, the second hydraulic chamber 40 is thus in fluid flow communication with the first hydraulic chamber 35. The second hydraulic chamber is arranged in the casing 31, while the first hydraulic chamber is defined by the casing 31 and by the first hydraulic assembly.

Specifically, the first hydraulic chamber 35 is defined radially by at least one strength member of the first resilient assembly 10, and in particular by the first outer strength member 15 and the casing 31 in FIG. 1, or by the first inner strength member 11 and by the casing 31 in FIG. 3.

Furthermore, and with reference to FIG. 1, the first hydraulic chamber 35 is defined axially by the first wall 32 in a first direction going from the first resilient assembly to the casing 31.

In a second direction opposite to the first direction, the first hydraulic chamber is directed towards the first resilient member. In order to avoid the fluid 41 coming into contact with the resilient member, the hydraulic damper then includes one floating piston per resilient assembly.

Consequently, a first floating piston 80 hydraulically isolates the first resilient member from the first hydraulic chamber 35.

Thus, the first floating piston thus defines axially the first hydraulic chamber 35 containing a hydraulic fluid 41, and an intermediate chamber CINT that is full of gas, e.g. gas subjected to atmospheric pressure. The elastomer material of the first resilient member is then in contact with the gas, and not with the fluid 41.

Optionally, the first outer strength member includes a translucent projection 87 that is visible from outside the hydroelastic damper. By way of example, a transparent cap is fastened to the second outer cylinder and projects radially outwards from the second outer cylinder. If the floating piston leaks, then the fluid penetrates into the projection 87. An operator can then detect the leak easily, without needing to disassemble the hydraulic damper 1.

The first floating piston 80 is not fastened to the first resilient assembly 10, and it is not fastened to the hydraulic assembly 30. Specifically, the first floating piston 80 is movable at least in translation along the longitudinal axis AL and possibly also in rotation about the longitudinal axis AL relative to the first inner strength member 11 and to the first outer strength member 15. Under such circumstances, the volume of the first hydraulic chamber 35 varies as a function of the position of the first floating piston 80 relative to the first wall 32, this position being variable.

This first floating piston 80 may present a section that is C-shaped, presenting a front face 81 directed towards the first wall 32 and a cylinder 82 that slides along a strength member, and by way of example along the first outer strength member 15 in the example of FIG. 1 or along the first inner strength member 11 in the example of FIG. 3.

With reference to FIG. 1, a first gasket 85 and/or at least two first guide rings 86 are each arranged between the first floating piston 80 and the first outer strength member 15. In FIG. 1, the first gasket 85 and the two first guide rings 86 are arranged in respective grooves in the cylinder 82 of the first floating piston 80. In FIG. 2, the first gasket 85 and the two first guide rings 86 are arranged respectively in grooves in the first outer strength member 15.

In FIG. 3, the first gasket 85 and/or at least two first guide rings 86 are each arranged between the first floating piston 80 and the first inner strength member.

In FIG. 1, and in certain positions, the first inner strength member 11 exerts only point thrust on a first point 83 of the first floating piston 80. This first point 83 may foe situated on an axis of symmetry and of revolution AROT of the first floating piston 80, this axis of symmetry and of rotation AROT coinciding with the longitudinal axis AL in FIG. 1.

In FIG. 3, the first outer strength member 11 exerts only point thrust on a first point 83 of the first floating piston 80.

In this context, and with reference to FIG. 1, each compression chamber presents a volume that varies as a function of the relative position of the first inner strength member 11 and of the outer strength member 15 of the corresponding resilient assembly. In particular, the volume of the first hydraulic chamber 35 decreases when the hydroelastic damper is compressed and increases when the hydroelastic damper is extended.

In another aspect, and with reference to the first embodiment of FIG. 1, the hydroelastic damper 1 has a single resilient assembly 10. Under such circumstances, the hydraulic assembly 30 may be secured to a connection head 25 referred to as the "second" connection head 27. This second connection head 27 is constrained at least to move in translation along the longitudinal axis AL together with the hydraulic assembly 30, this hydraulic assembly 30 being constrained at least to move in translation with the outer strength member along the longitudinal axis AL, or with the inner strength member, depending on the selected alternative. This second connection head 27 may be integrated in the hydraulic assembly 30, or it may be fastened thereto by conventional means. By way of example, the second connection head 27 includes a ball-joint head 271 secured to a leg 272, the ball-joint head 271 being provided with a universal joint centered on the longitudinal axis AL and/or the leg optionally being screwed to the hydraulic assembly 30.

In the second embodiment of FIG. 4, the hydroelastic damper 1 comprises the first resilient assembly 10, the hydraulic assembly 30, and also a second resilient assembly 100. The two resilient assemblies 10 and 100 are positioned on either side of the second hydraulic chamber.

Under such circumstances, the second resilient assembly 100 may have the same members as the first resilient assembly 10.

Thus, the second resilient assembly 100 comprises a second inner strength member 10. This second inner strength member 110 may a single piece or a plurality of pieces fastened to one another. The second inner strength member 110 may comprise a second inner cylinder 1200, which is hollow. By way of example, this second inner cylinder 1200 may have a base that is circular, or of some other shape, e.g. a polygonal shape. The second inner cylinder 1200 may extend longitudinally along a longitudinal axis AL from an end referred to as its "second inner end" 1210 to an end referred to as its "second outer end" 1220. The longitudinal axis AL may be an axis of symmetry of the second internal cylinder 1200.

The second resilient assembly further comprises a second outer strength member 150. This second outer strength member 150 may comprise a single piece or it may comprise a plurality of pieces fastened to one another. The second outer strength member 150 surrounds the second inner strength member 110, at least in part, and for example may surround at least a portion of the second inner cylinder 1200.

Thus, the second outer strength member 150 may comprise a second outer cylinder 160, which is hollow. The second outer cylinder 160 may surround the second inner cylinder 1200, at least in part. The second, outer cylinder 160 and the second inner cylinder 1200 may be coaxial. By way of example, the second outer cylinder 160 may have a base that is circular, or of some other shape. The second outer cylinder 160 may extend longitudinally along the longitudinal axis AL from an end portion referred to as its "second outer end zone" 1610 to an end portion referred to as its "second inner end zone" 1620.

Furthermore, the second resilient assembly 100 has a second resilient member 200 connecting the second outer strength member 150 to the second inner strength member 110 and allowing the second outer strength member 150 at least one degree of freedom to move in translation along the longitudinal axis AL relative to the second inner strength member 110. The second resilient member 200 provides the second outer strength member 150 and the second inner strength member 110 with resilient return towards the rest position shown in FIG. 4. The second resilient member 200 extends radially, i.e. perpendicularly to the longitudinal axis AL, between at least one face of the second inner cylinder 1200 and a face of the second outer cylinder 160, which faces face each other.

The second resilient member 200 may comprise at least one block 210 made of elastomer material, and in particular an elastomer block that is secured to the first inner cylinder and to the first outer cylinder, or that is constrained to move in translation together therewith. The second resilient member 200 may comprise resilient subassemblies of some other type, e.g. springs or the equivalent.

In the alternative of FIG. 4, the second inner strength member 110 may have a second fastener end 130 that extends the second inner cylinder 1200 along the longitudinal axis AL, being adjacent to the second outer end 1220. This second fastener end 130 closes the second inner cylinder at its second outer end 1220, while, on the contrary, the second inner end 1210 is open to the outside and possibly shut by a plug 1230. The second fastener end 130 may be fastened to the second inner cylinder 1200 by conventional screw, welding, riveting, . . . means, or the second fastener end 130 and the second inner cylinder 1200 may represent two segments of a single unitary part.

Furthermore, a connection head 25, referred to as a "second connection head" 27 may be secured to the second fastener end 130. This second connection head 27 is secured to the first inner strength member 110 or is at least constrained to move in translation therewith along the longitudinal axis AL. The second connection head 27 may be integrated in the second inner strength member 110 or it may be fastened thereto by conventional means. For example, the second connection head 27 comprises a ball-joint head 271 secured to a leg 272, the ball-joint head 271 possibly being provided with a universal joint centered on the longitudinal axis AL, and/or the leg 272 possibly being screwed to the second fastener end 130.

In addition, the second inner end zone 1610 may be open. In the example of FIG. 4, the second outer end zone 1610 surrounds the second inner strength member, while the second inner end zone 1620 projects longitudinally beyond the second inner end 1210 of the second inner strength member 110.

In an alternative, the second fastener end 130 is secured not to the second inner strength member 110, but rather to the second outer strength member 15.

In the variant of FIG. 4, the casing 31 is fastened to the second inner end zone 1620 of the second outer strength member 150, optionally via conventional means and a static gasket. The casing 31 is then constrained to move in translation together with the second outer strength member 150 along the longitudinal axis AL. In another variant, the casing 31 is fastened to the second inner end of the second inner strength member 110, optionally by conventional means and a static gasket.

Furthermore, the casing 31 has at least one hydraulic connection passing therethrough, which connection is referred to as a "channel" and opens out into a third hydraulic chamber 350.

Thus, at least one channel may pass through a second wall 33 of the casing 31 in order to put the third hydraulic chamber 350 into fluid flow communication with the second hydraulic chamber 40.

For example, the second hydraulic chamber 40 is connected by at least three hydraulic channels to the third hydraulic chamber 350.

These three channels may be of the same types as the three connections 60, 65, and 70 as described above.

Independently of the nature of the channels, the second hydraulic chamber 40 is thus in fluid flow connection with the third hydraulic chamber 350. The second hydraulic chamber is arranged in the casing 31, while the third hydraulic chamber is defined by the casing 31 and by the second hydraulic assembly.

Alternatively, or in addition, a hydraulic connection that is not shown in the figures serves to connect the first hydraulic chamber 35 hydraulically with the third hydraulic chamber 350.

By way of example, the damper need not have the at least three channels with the third hydraulic chamber 350 then being in hydraulic communication only with the first hydraulic chamber 35 via said hydraulic connection. Such a variant tends to be lighter in weight.

Specifically, the third hydraulic chamber 350 is defined radially by at least one strength member of the second resilient assembly 100, and in particular by the second outer strength member 150 in the example shown, and by the casing 31.

Furthermore, the third hydraulic chamber 350 is defined axially in the above-mentioned second direction by the second wall 33.

In the above-mentioned first direction, the third hydraulic chamber is directed towards the second resilient member. In order to avoid the fluid 41 coming into contact with this second resilient member, the hydraulic damper then includes a second floating piston of the same type as the first floating piston.

Consequently, a second floating piston 800 isolates the second resilient member hydraulically from the third hydraulic chamber 350.

Thus, the second floating piston axially defines the third hydraulic chamber 350 containing a hydraulic fluid and an intermediate chamber that is filled with gas, e.g. gas that is subjected to atmospheric pressure. The elastomer material of the second resilient member is then in contact with the gas, and not with the fluid 41. Optionally, the second outer strength member includes a translucent projection 870 that is visible from the outside of the hydroelastic damper.

The second floating piston 800 is not fastened to the second resilient assembly 100, nor it is fastened to the hydraulic assembly 30 nor even to the first resilient assembly 10. Specifically, this second floating piston 800 is movable at least in translation along the longitudinal axis AL, and possibly also in rotation about the longitudinal axis AL, relative to the second inner strength member 110 and to the second outer strength member 150. Under such circumstances, the volume of the third hydraulic chamber 350 varies as a function of the position of the second floating piston 800 relative to the second wall 33, which position is variable.

The second floating piston 800 may have a section that is C-shaped, presenting a front face directed towards the second wall 33 and a cylinder that slides along one of the strength members, e.g. along the second outer strength member 150.

A second gasket 850 and/or at least two first guide rings 860 are each arranged between the second floating piston 800 and the second strength member along which the second floating piston slides, specifically the second outer strength member 150 in FIG. 4, e.g. being received in grooves in the second floating piston 800 or in the second strength member in question.

In certain positions, the second inner strength member 110 exerts only point thrust on a second point 830 of the second floating piston 800. This second point 830 may be situated on an axis of symmetry and of revolution AROT of the second floating piston 800, this axis of symmetry and of revolution AROT coinciding with the longitudinal axis AL in FIG. 4. In another variant, the second outer strength member 150 exerts only point thrust on the second point 830 of the second floating piston 800.

FIG. 5 is a graph plotting a compression force that varies as a function of the relative movement between each inner strength member and the associated outer strength member of a hydroelastic damper of the invention. This graph plots said movement in millimeters (mm) along the abscissa axis and said force in decanewtons (daN) up the ordinate axis. This force follows a relationship 900 having three slopes A, B, and C. The values given are given by way of illustration.

FIGS. 1, 6, and 7 explain the operation of the hydroelastic damper 1. This operation is described on the basis of the embodiment of FIG. 1, for convenience. Nevertheless, the other variants of the invention operate in similar manner.

FIG. 1 shows the hydroelastic damper 1 at rest.

With reference to FIG. 6, when the hydroelastic damper 1 is compressed, then the first connection head 26 and the second connection head 27 move longitudinally towards each other along arrows F0. This compression is made possible by the first inner strength member 11 moving relative to the first outer strength member 15 while deforming the corresponding first resilient member 20.

The first inner strength member 11 pushes the first floating piston 80 via point thrust. Under such circumstances, the volume of the first hydraulic chamber 35 is reduced, with the fluid 41 escaping from the first hydraulic chamber 35 by passing through the constriction in the duct 61 of the first connection along arrow F1. The volume of the second hydraulic chamber 40 increases, with the expansion piston 45 moving away from the end wall of the casing along arrow F2 opposing centrifugal force, and compressing the air 700 or a return spring, if any. The hydroelastic damper 1 then behaves by following the first slope A of the relationship 900.

If compression continues, then the pressure that exists in the first hydraulic chamber 35 increases. Once this pressure exceeds the threshold for opening the pressure-relief valve, the pressure-relief valve opens progressively. The fluid 41 escapes from the first hydraulic chamber 35 via the duct along arrow F1 and via the second connection along arrow F3. The rate at which fluid flows through the pressure-relief valve increases progressively as the valve opens progressively. The hydroelastic damper then behaves by following the second slope B of the relationship 900.

If compression continues, the pressure-relief valve opens fully. The term "fully" means that the pressure-relief valve has come into abutment and can therefore not open any further. The hydroelastic damper then behaves by following the third slope C of the above-described triple-slope relationship 900.

With reference to FIG. 7, when the hydroelastic damper is stretched, the first connection head 26 and the second connection head 27 move apart from each other longitudinally along arrows F5. The pressure of the fluid 41 in the first hydraulic chamber 35 drops suddenly and the pressure-relief valve closes. Conversely, the check valve in the third connection opens. The second hydraulic chamber 40 empties via the first connection along arrow F7 and via the third connection along arrow F6. The expansion piston 45 moves along arrow F8 going towards the end wall of the casing in order to contribute to discharging fluid from the expansion chamber. Centrifugal force FC, and the return spring, if any, enhance this movement given the way the travel axis of the piston is oriented.

Conversely, the first hydraulic chamber 35 fills, thereby moving the first floating piston 80 away from the second hydraulic chamber. With this first floating piston, any risk of cavitation is at least reduced. Specifically, the first floating piston is disconnected from the first inner strength member. Only the pressure that exists in the first hydraulic chamber 35 tends to move the first floating piston in order to press it against the first inner strength member. Thus, in the event of a sudden movement, if the pressure that exists in the first hydraulic chamber 35 is not sufficient, i.e. if the pressure that exists in the first hydraulic chamber 35 is lower than the pressure that exists in the intermediate chamber CINT, the first floating piston does not follow the first inner strength member so as to stay in contact with it, and does not create a vacuum that would give rise to cavitation in the first hydraulic chamber 35.

With reference to FIG. 8, such a hydroelastic damper 1 may advantageously be fastened to two adjacent lift assemblies of a rotor 501.

A rotor 501 of the invention may thus comprise a hub 505 carrying a plurality of lift assemblies 502. By way of example, each lift assembly 502 may comprise a blade 503 connected directly to the hub, e.g. via a spherical abutment, or indeed a blade 503 that is connected to a connection member 504 that is itself connected to the hub. By way of example, a lift assembly 502 may comprise a blade with an integrated cuff or a blade that is fastened to a cuff. Under such circumstances, each lift assembly may be connected to two other lift assemblies respectively via two hydroelastic dampers 1.

Each hydroelastic damper 1 is then hinged via its first connection head to one lift assembly, e.g. its cuff or its blade, and via its second connection head to another lift assembly, e.g. the cuff or the blade of the other lift assembly.

Figure 9:
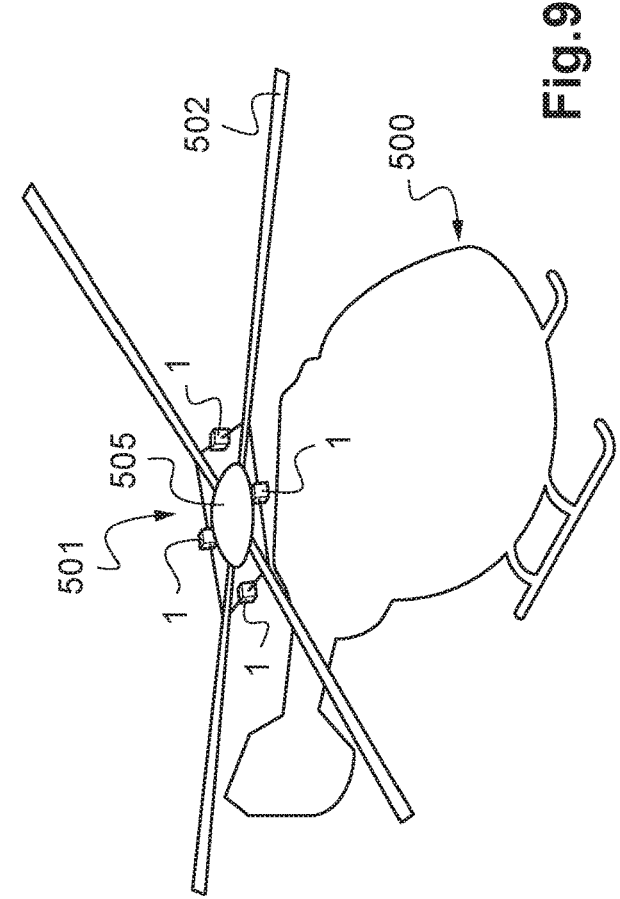
FIG. 9 is a diagram showing an aircraft fitted with hydroelastic dampers of the invention.

FIG. 9 shows an aircraft 500 of the invention.

In particular, the aircraft 500 may comprise an airframe carrying a rotor 501 of the type shown in FIG. 8.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

FIGS. 1 to 7 describe a particular damper, however other types of damper may be provided with a floating piston of the invention, e.g. a damper of the type described in Document FR 2 736 890.

What is claimed is:

1. A hydroelastic damper comprising at least one resilient assembly, the at least one resilient assembly including a first resilient assembly, the first resilient assembly comprising a first inner strength member that is engaged at least in part in a first outer strength member, the first inner strength member and the first outer strength member being movable relative to each other at least in translation along a longitudinal axis, the first resilient assembly comprising a first resilient member secured to the first outer strength member and to the first inner strength member so as to provide resilient return of the first outer strength member and of the first inner strength member towards a rest position, the first resilient member extending radially between the first outer strength member and the first inner strength member, the hydroelastic damper comprising at least one hydraulic assembly provided with a first hydraulic chamber and a second hydraulic chamber in communication with each other via at least one connection provided in a first wall of the hydraulic assembly, a fluid being arranged in the first hydraulic chamber and in the second hydraulic chamber, wherein the hydroelastic damper includes a first floating piston that is movable at least in translation along the longitudinal axis relative to the first inner strength member and to the first outer strength member, the first hydraulic chamber having a volume that is variable and that is defined at least by the first floating piston and the first wall, the first floating piston hydraulically isolating the first resilient member from the fluid.

2. The hydroelastic damper according to claim 1, wherein the first floating piston slides along the first outer strength member or the first inner strength member, a first gasket being arranged between the first floating piston and the first outer strength member or first inner strength member along which the first floating piston slides.

3. The hydroelastic damper according to claim 1, wherein the first floating piston slides along the first outer strength member or the first inner strength member, with at least two first guide rings being arranged each between the first floating piston and the first outer strength member or the first inner strength member along which the first floating piston slides.

4. The hydroelastic damper according to claim 1, wherein the first floating piston is not fastened to the first resilient assembly and is not fastened to the hydraulic assembly.

5. The hydroelastic damper according to claim 1, wherein the first hydraulic chamber is defined in part by the first outer strength member or the first inner strength member.

6. The hydroelastic damper according to claim 1, wherein the first wall is constrained to move in translation along the longitudinal axis with the first outer strength member, wherein the first resilient member comprises one or more annular elastomeric blocks.

7. The hydroelastic damper according to claim 1, wherein the first inner strength member or the first outer strength member exerts only point thrust on a first point of the first floating piston when the first floating piston is in contact with the first inner strength member or first outer strength member.

8. The hydroelastic damper according to claim 7, wherein the first point of the first floating piston is situated on an axis of symmetry and of revolution of the first floating piston.

9. The hydroelastic damper according to claim 1, wherein the hydraulic assembly comprises a casing that includes the first wall, the second hydraulic chamber being defined by the casing and by an expansion piston that is movable in translation relative to the casing.

10. The hydroelastic damper according to claim 1, wherein the hydraulic assembly is secured to a ball-joint connection head in alignment with a ball-joint connection head of the first resilient assembly.

11. The hydroelastic damper according to claim 1, wherein the at least one resilient assembly comprises a second resilient assembly, the second resilient assembly comprising a second inner strength member and a second outer strength member that are movable relative to each other at least in translation along the longitudinal axis, the second resilient assembly comprising a second resilient member secured to the second outer strength member and to the second inner strength member so as to provide resilient return for the second outer strength member and the second inner strength member towards an initial position, the hydroelastic damper comprising a third hydraulic chamber, the hydroelastic damper including a second floating piston that is movable at least in translation along the longitudinal axis relative to the second inner strength member and to the second outer strength member, the third hydraulic chamber having a volume that is variable and that is defined at least by the second floating piston and by a second wall of the hydraulic assembly, the second floating piston hydraulically isolating the second resilient member from the fluid.

12. The hydroelastic damper according to claim 11, wherein the second floating piston slides along the second outer strength member or the second inner strength member, with a second gasket being arranged between the second floating piston and the second outer strength member or the second inner strength member along which the second floating piston slides.

13. The hydroelastic damper according to claim 11, wherein the second floating piston slides along the second outer strength member or the second inner strength member, at least two second guide rings being arranged each between the second floating piston and the second outer strength member or the second inner strength member along which the second floating piston slides.

14. The hydroelastic damper according to claim 11, wherein the second floating piston is not fastened to the second resilient assembly and is not fastened to the hydraulic assembly.

15. The hydroelastic damper according to claim 11, wherein the third hydraulic chamber is defined in part by the second outer strength member or the second inner strength member.

16. The hydroelastic damper according to claim 11, wherein the second wall is constrained to move in translation with the second outer strength member or with the second inner strength member.

17. The hydroelastic damper according to claim 11, wherein the first and second resilient assemblies are positioned on either side of the second hydraulic chamber, two ball-joint connection heads belonging respectively to the first and second resilient assemblies being in alignment.

18. The hydroelastic damper according to claim 11, wherein the second inner strength member or the second outer strength member exerts point thrust only on a second point of the second floating piston when the second floating piston is in contact with the second inner strength member or the second outer strength member.

19. The hydroelastic damper according to claim 18, wherein the second point of the second floating piston is situated on an axis of symmetry and of revolution of the second floating piston.

20. An aircraft having a rotor contributing to providing the aircraft at least with lift, the rotor comprising a hub carrying a plurality of lift assemblies, wherein the rotor includes at least one hydroelastic damper according to claim 1 fastened to at least one lift assembly.

* * * * *